(12) United States Patent
Zeng et al.

(10) Patent No.: US 10,817,409 B2
(45) Date of Patent: Oct. 27, 2020

(54) SYSTEM AND METHOD FOR TESTING SOFTWARE APPLICATIONS IN A SOFTWARE DEFINED NETWORK

(71) Applicant: AT&T Intellectual Property I, L.P., Atlanta, GA (US)

(72) Inventors: Xiangwei Zeng, Somerset, NJ (US); Teh-Hsin Wu, Holmdel, NJ (US); Zhenzhen Wang, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 36 days.

(21) Appl. No.: 16/240,041

(22) Filed: Jan. 4, 2019

(65) Prior Publication Data
US 2019/0155720 A1 May 23, 2019

Related U.S. Application Data

(63) Continuation of application No. 15/480,592, filed on Apr. 6, 2017, now Pat. No. 10,204,034.

(51) Int. Cl.
G06F 9/44 (2018.01)
G06F 11/36 (2006.01)

(52) U.S. Cl.
CPC ........ G06F 11/3684 (2013.01); G06F 11/368 (2013.01); G06F 11/3664 (2013.01); G06F 11/3672 (2013.01); G06F 11/3688 (2013.01)

(58) Field of Classification Search
CPC ............ G06F 11/3684; G06F 11/3664; G06F 11/3672; G06F 11/368; G06F 11/3688

USPC .................................................. 717/124–130
See application file for complete search history.

(56) References Cited

U.S. PATENT DOCUMENTS

| 5,694,540 | A | * | 12/1997 | Humelsine ............... G06F 8/71 714/33 |
| 5,794,043 | A | * | 8/1998 | Kolb ................... G06F 11/3688 714/E11.208 |
| 6,061,643 | A | * | 5/2000 | Walker ............... G06F 11/3688 702/123 |
| 6,138,112 | A | * | 10/2000 | Slutz .................. G06F 11/3672 707/748 |
| 6,505,342 | B1 | | 1/2003 | Hartmann et al. |
| 6,581,052 | B1 | * | 6/2003 | Slutz .................. G06F 11/3672 |
| 6,698,012 | B1 | * | 2/2004 | Kossatchev ......... G06F 11/3684 714/E11.208 |
| 6,701,514 | B1 | | 3/2004 | Haswell et al. |
| 6,907,546 | B1 | | 6/2005 | Haswell et al. |
| 6,928,393 | B2 | | 8/2005 | Czerwonka |
| 7,210,066 | B2 | * | 4/2007 | Mandava ............ G06F 11/3676 714/38.14 |

(Continued)

OTHER PUBLICATIONS

Kayes, "Test Case Prioritization for Regression Testing Based on Fault Dependency", IEEE, pp. 48-52 (Year: 2011).*

(Continued)

*Primary Examiner* — Anil Khatri
(74) *Attorney, Agent, or Firm* — BakerHostetler

(57) ABSTRACT

A system, method and computer-readable medium for testing a service-based application identifies a set of use cases for the service-based application. Each use case in the set is mapped to a test case to generate a first set of test cases. Each of the test cases is refined to generate an updated set of test cases and the updated set of test cases is executed.

17 Claims, 4 Drawing Sheets

(56) References Cited

U.S. PATENT DOCUMENTS

| | | | |
|---|---|---|---|
| 7,299,452 B1* | 11/2007 | Zhang | G06F 40/129 717/124 |
| 7,334,220 B2* | 2/2008 | Chang | H04L 63/0815 709/224 |
| 7,386,521 B2 | 6/2008 | Adir et al. | |
| 7,490,319 B2* | 2/2009 | Blackwell | G06F 11/3664 717/124 |
| 7,493,597 B2 | 2/2009 | Hefner | |
| 7,623,981 B2 | 11/2009 | Achkar et al. | |
| 7,779,374 B1 | 8/2010 | Hamid et al. | |
| 7,810,070 B2* | 10/2010 | Nasuti | G06F 11/3688 717/124 |
| 8,001,532 B1* | 8/2011 | Jakubiak | G06F 11/3684 714/46 |
| 8,145,458 B1* | 3/2012 | Kukal | G06F 30/367 703/4 |
| 8,239,757 B2 | 8/2012 | Johnson et al. | |
| 8,276,123 B1* | 9/2012 | Deng | G06F 11/368 717/125 |
| 8,365,147 B2 | 1/2013 | Grechanik et al. | |
| 8,407,671 B2* | 3/2013 | Ananny | G06F 11/2221 717/124 |
| 8,448,131 B2* | 5/2013 | Ottavi | G06F 11/3664 717/104 |
| 8,543,983 B2 | 9/2013 | Murthy | |
| 8,640,106 B2 | 1/2014 | Weigert | |
| 8,799,864 B2* | 8/2014 | Chen | G06F 30/33 717/124 |
| 8,799,866 B2 | 8/2014 | Bullard et al. | |
| 8,881,105 B2* | 11/2014 | Quilter, Jr. | G06F 11/3672 714/38.1 |
| 8,914,679 B2 | 12/2014 | Apostoloiu et al. | |
| 8,954,933 B2 | 2/2015 | Bullard et al. | |
| 9,104,810 B2 | 8/2015 | Zhang | |
| 9,135,147 B2 | 9/2015 | Artzi et al. | |
| 9,229,846 B1* | 1/2016 | Budhai | G06F 11/3624 |
| 9,292,420 B2 | 3/2016 | Akbulut et al. | |
| 9,367,435 B2 | 6/2016 | Sinyagin et al. | |
| 9,495,642 B1 | 11/2016 | Smith et al. | |
| 9,524,230 B2 | 12/2016 | Kalyanasundram | |
| 9,547,583 B2 | 1/2017 | Jordan | |
| 9,703,693 B1* | 7/2017 | Pasupuleti | G06F 11/3692 |
| 10,592,398 B1* | 3/2020 | Dwarakanath | G06F 11/3672 |
| 2014/0289706 A1 | 9/2014 | Miyazaki et al. | |
| 2015/0254166 A1 | 9/2015 | Harden et al. | |
| 2016/0239409 A1 | 8/2016 | de Oliveira Staudt et al. | |
| 2016/0299830 A1 | 10/2016 | Chastain et al. | |
| 2017/0046245 A1 | 2/2017 | Liu et al. | |
| 2017/0052884 A1 | 2/2017 | Ganda et al. | |

OTHER PUBLICATIONS

Ansari et al, "Optimization of Test Suite—Test Case in Regression Test", IEEE, pp. 1-4 (Year: 2013).*

Satigo et al, "Abstract Flow Learning for Web Application Test Generation", ACM, pp. 49-55 (Year: 2018).*

Korel et al, "Automated Regression Test Generation", ACM, pp. 143-152 (Year: 1998).*

Li et al, "Search Algorithms for Regression Test Case Prioritization", IEEE, pp. 225-237 (Year: 2007).*

Hwang et al, "A history-based cost-cognizant test case prioritization technique in regression testing", The Journal of Systems and Software, pp. 626-637 (Year: 2012).*

Mei et al, "Test Case Prioritization for Regression Testing of Service-Oriented Business Applications", ACM, pp. 901-910 (Year: 2009).*

Chimisliu et al, "Category Partition Method and Satisfiability Modulo Theories for Test Case Generation", IEEE, pp. 64-70 (Year: 2012).*

Elbaum et al, "Prioritizing Test Cases for Regression Testing", ACM, pp. 102-112 (Year: 2000).*

Yang et al, "System modules interaction based stress testing model", IEEE, pp. 138-141 (Year: 2010).*

"TCS Software Defined Networking Test Harness"; TATA Consultancy Services Limited; © 2014; 4 pages.

Diep, "Analysis of a Deployed Software", ACM, pp. 595-598, 2007.

Dam et al, "DeepSoft: A Vision for a Deep Model of Software", ACM, pp. 944-947, 2016.

Fraser et al, "Generating Parameterized Unit Tests", ACM, pp. 364-374, 2011 (Year: 2011).

Zeil et al, "Detection of Linear Errors via Domain Testing", ACM, pp. 422-451, 1992 (Year: 1992).

Munakata et al, "Model-Based Test Case Generation using Symbolic Execution", ACM, pp. 23-28, 2013 (Year: 2013).

Landhau er et al, "Automated Test-Case Generation by Cloning", IEEE, pp. 83-88, 2012 (Year: 2012).

* cited by examiner

SYSTEM AND METHOD FOR TESTING SOFTWARE APPLICATIONS IN A SOFTWARE DEFINED NETWORK

CROSS REFERENCE TO RELATED APPLICATIONS

This application is a continuation of, and claims priority to, U.S. patent application Ser. No. 15/480,592, filed Apr. 6, 2017, entitled "System And Method For Testing Software Applications in A Software Defined Network," the entire contents of which are hereby incorporated herein by reference.

TECHNICAL FIELD

The present disclosure relates generally to software testing and verification. More particularly, the disclosure relates to methods and systems for automatically testing software applications in a software defined network.

BACKGROUND

In Software Defined Network (SDN) development environment, Agile or DevOps methodology and Continuous Integration (CI) are usually required. Agile software development relates to an approach for software development under which requirements and solutions evolve through the collaboration of cross-functional teams. Agile development promotes adaptive planning, evolutionary development, early delivery, and continuous improvement, and facilitates rapid and flexible response to change. Hence, these approaches are becoming more and more popular, and have been adopted by SDN software and network application development companies as a means of improving the quality of software, and reducing the amount of time it takes to deliver the software.

SDN Software-defined networking (SDN) is an umbrella term encompassing several kinds of network technology aimed at making the network as agile and flexible as the virtualized server and storage infrastructure of the modern data center. Due to the programmability of SDN, the risk of bugs and challenges for testing has been increased. As a result, the quality of SDN control software and network services actually determine the reliability of SDN.

Currently, testing is performed using a Model Based Testing approach. Model-based testing is an application of model-based design for designing and executing artifacts to perform software testing or system testing. Models can be used to represent the desired behavior of a system under test, or to represent testing strategies and a test environment. Because test suites are derived from models and not from source code, model-based testing is a form of black-box testing. The current Model-Based Testing based on the system description for application under test as finite state machines to generate test cases depending on the complexity of system under test, the corresponding model still could be very complicated and hard to use in real word.

Software correctness verification is a complicated subject. From a pure correctness verification perspective, people look for program invariants, and use Predicate Abstraction on the state space of program variables, Model Check etc. to verify its correctness. Program invariants are conditions that can be relied upon to be true during execution of a program, or during some portion of it. A program invariant is a logical assertion that is held to always be true during a certain phase of execution. For example, a loop invariant is a condition that is true at the beginning and end of every execution of a loop. The invariants are usually hard to find and for a middle-scale program usually has a large variable/predicate state space. With these difficulties, automated correctness verification is not used outside of a laboratory environment. From black-box testing perspective, methods to automatically verify service correctness for the SDN software are not available.

Currently test cases are usually managed by testers. Each person has his/her own test cases so that later on, the regression tests are sometimes hard to perform because there are no complete test scripts for a given release delivery. Often testers have to rewrite regression scripts to test same things which previously have been tested by others.

Currently tests typically use simulated data to do load/stress tests. This is because of lack of real data for systems. Many real world scenarios may not be tested so that the problems have to be faced after production deployment.

There is a need to provide methods for testing SDN software that avoids the disadvantages inherent in the model-based testing approach. There is a need to provide methods for testing SDN software that do not rely on program invariants to verify the correctness of the SDN software. There is a need to provide methods for testing SDN software that can be made available to a variety of users. There is a need to provide methods for testing SDN software that use real-world data to identify problems that have to be faced after production development.

SUMMARY

To achieve the foregoing, one embodiment provides a method of testing a service-based application including: identifying a set of use cases for the service-based application, mapping each use case in the set of use cases to a test case to generate a first set of test cases, refining each of the test cases in the first set of test cases to generate an updated set of test cases, and executing updated set of test cases. Other embodiments of this aspect include corresponding computer systems, apparatus, and computer programs recorded on one or more computer storage devices, each configured to perform the actions of the methods.

Another general aspect includes a system for testing a service based application including: a computer system, a test case generator associated with the computer system for generating executable test cases with propositional statements, a test case interpreter for interpreting the propositional statements generated by the test case generator by checking a state of services under test, a service specification acquisition module for acquiring all service specifications, and a basic functions library associated with the computer system.

One general aspect includes non-transitory computer readable medium including computer executable instructions embodied in a computer readable medium and when executed by a processor of a computer performs steps including: identifying a set of use cases for a service based application, mapping each use case in the set of use cases to a test case to generate a first set of test cases, refining each of the test cases in the first set of test cases to generate an updated set of test cases, and executing the updated set of test cases.

DETAILED DESCRIPTION OF ILLUSTRATIVE EMBODIMENTS

From a black-box testing perspective, the service states determine the state of the application so instead of describing the application under test as a finite state machine, one may identify the service-flow in a Use Case/Use story of requirement and input & output conditions to generate an executable test case with propositional formulas. When a test case runs, these formulas are interpreted based on related service states to verify if those formulas are satisfied. A test case library is provided to help implement test cases universal management. For a given software release, there is a set of executable test cases in a test case library corresponding to use cases of requirements. As such, regression tests are very easy to be carried out. A solution to load/stress tests is to provide testers ability to look at historic data in production databases. Statistic tools could be used to pinpoint the application peak hours and the related data can be extracted from database and schedule to reapply to the application being tested. Since original timing and concurrency are kept, many real world scenarios can be tested in this way before production deployment.

In an embodiment a new black-box testing framework for testing a service-based application systems is provided, where a service type is either representational state transfer (REST) (recommended by OpenFlow for SDN northbound interface) or Simple Object Access Protocol (SOAP) to meet the needs of SDN network applications testing for the northbound interface and traditional web services.

Figure 1:
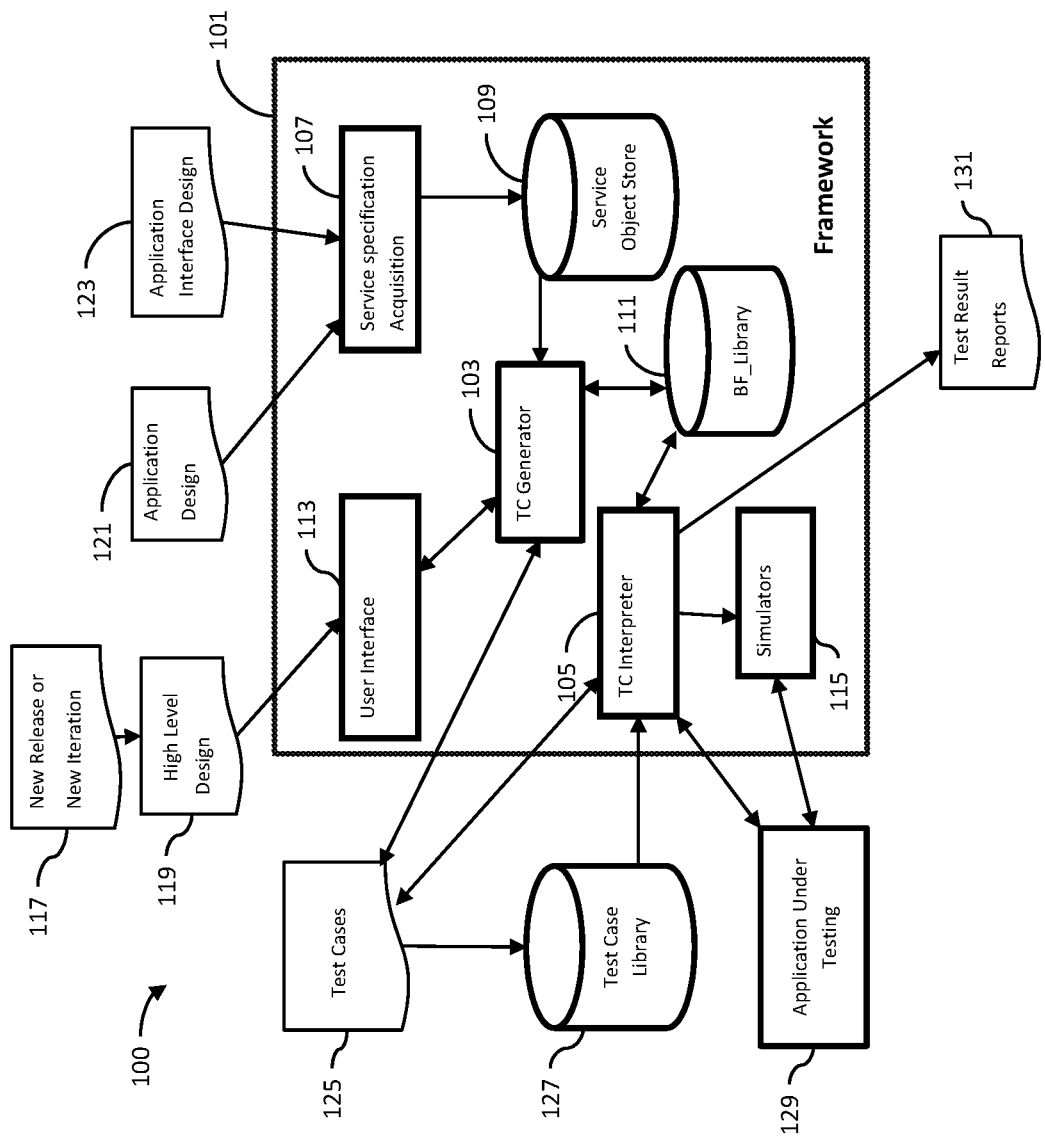
FIG. 1 is a block diagram illustrating a framework architecture for testing application systems.

An embodiment of the testing framework provides:

Conversion of service-flow with input/output constraints in requirement to executable test cases with a group of propositional logic formulas;

Interpretation of formulas at test case run-time to implement Verification Automation(VA);

Management of generated test cases centrally in test case library so that regression tests can be performed effectively and efficiently; and Utilization of historical data in production database for load/stress tests so that many real world scenarios can be tested before production deployment The Framework Supports Functional Tests, Load/Stress Tests and Regression Tests FIG. 1 illustrates a framework architecture 100 for testing application systems. The framework architecture 100 includes framework 101.

The framework 101 includes a test case generator (TC generator 103). TC generator 103 generates executable test cases by mapping a use case to a group of test cases, with propositional statements (p→q logic structure) being abstracted from the corresponding service-flow and service input and output conditions. This can be done either automatically or manually depending upon the needs.

The framework 101 includes a test case interpreter (TC interpreter 105). TC interpreter 105 interprets the propositional statements, when a test case is run, by checking state of services under test to perform verification steps automatically. The final evaluation of the propositional statements determines a success or failure of the test case. When all services in service-flow return a success, the test case is passed. If, on the other hand, there is a failed service, TC interpreter 105 terminates interpretation of the test case and returns with the failed service information. TC interpreter 105 also performs lexical, syntactical and type check on the test case and invokes basic functions from a built-in library (BF library 111).

The framework 101 includes a service specification acquisition module 107 that acquires all service specification from Application Design 121 (where the application architecture and service implementations design are specified) and Application Interface Design 123 (where interface requirements for one application to another are specified), creates corresponding service classes with attributes of the service, attributes of testing such as service type, URL and protocol string format, and method of testing like get, send, etc. A service class consists of attributes including all fields with possible values of service request and response, service types such as SOAP, REST etc., with format of XML, JSON etc., service network address for request to send, and methods to process data of attributes. These generated service classes are saved on service object store 109 and are ready to be accessed by TC_Interpreter 105.

The framework 101 includes BF library 111 that archives a set of basic functions that are developed by testers to support all functionality of the framework 101.

The framework 101 includes a user interface 113 that may be a graphical user interface (GUI), which is used for users to interact with the framework 101. Use cases and use stories can be entered here and then abstracted into service-flow with input and output conditions.

In operation, data from a new release 117 may be used to develop a high level design 119 which in turn may be provided to user interface 113. Information from an advance design 121 or an application interface design 123 may be provided to service specification acquisition module 107 for creating all service specifications. The service specification acquisition module 107 is used to extract service requirement specifications and other service related information from AD and AID documents. For example, all fields and possible values of a service request and response are extracted from AID by this module. Data from the service specification acquisition module 107 may be stored in service object store 109. The TC generator 103 may receive data from service object store 109, user interface 113 or from test cases 125. The output of the TC generator 103 may be stored in the BF library 111. TC interpreter 105 may exchange data with BF library 111, test cases 125 or application under testing module 129 and may receive data directly from test case library 127. The TC interpreter 105 will provide data to simulator module 115 which may also exchange data with the application under testing module 129. The simulator module 115 is used for simulating the required service request or response in testing when a real service is not available. The TC interpreter 105 may also provide data to the test results report module 131.

Figure 2:
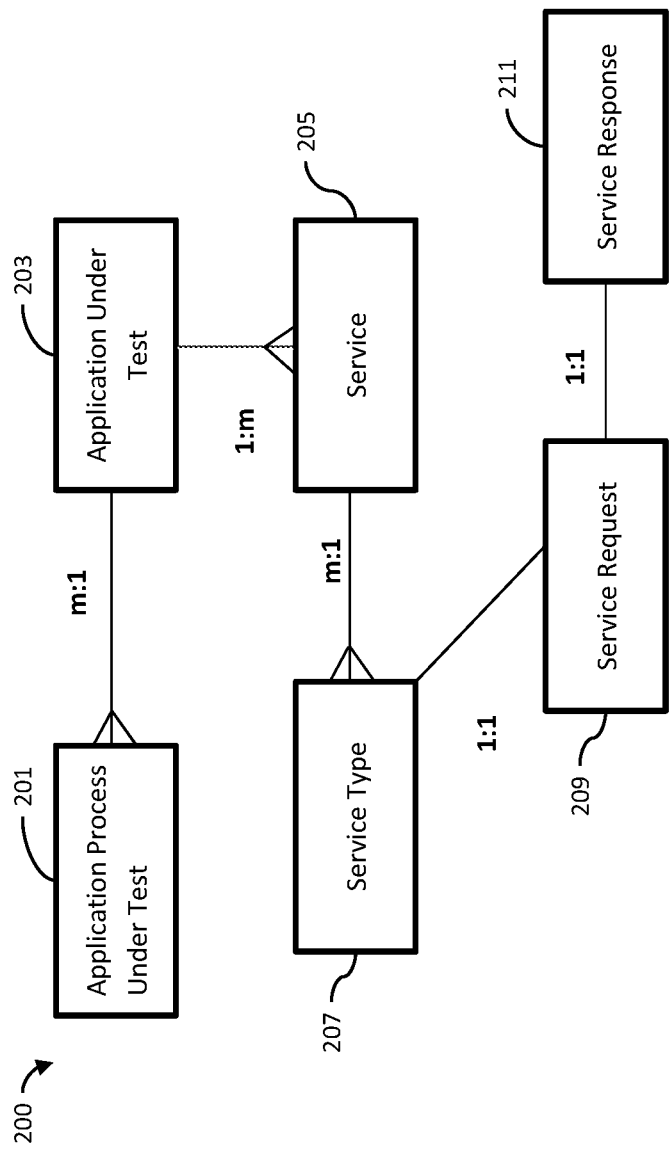
FIG. 2 is a block diagram illustrates the relationship between application services and application under test.

FIG. 2 illustrates the relationship 200 between service and application under test. The application under test 203 may have a plurality of application processes under test (many to one relationship). The application under test 203 may have a plurality of services associated therewith (one to many relationship). For each service 205 there may be a plurality of service types 207 (many to one relationship) and each service type 207 will have a service request 209 (one-to-one relationship). Each service request 209 will have a service response 211 (one-to-one relationship).

Figure 3:
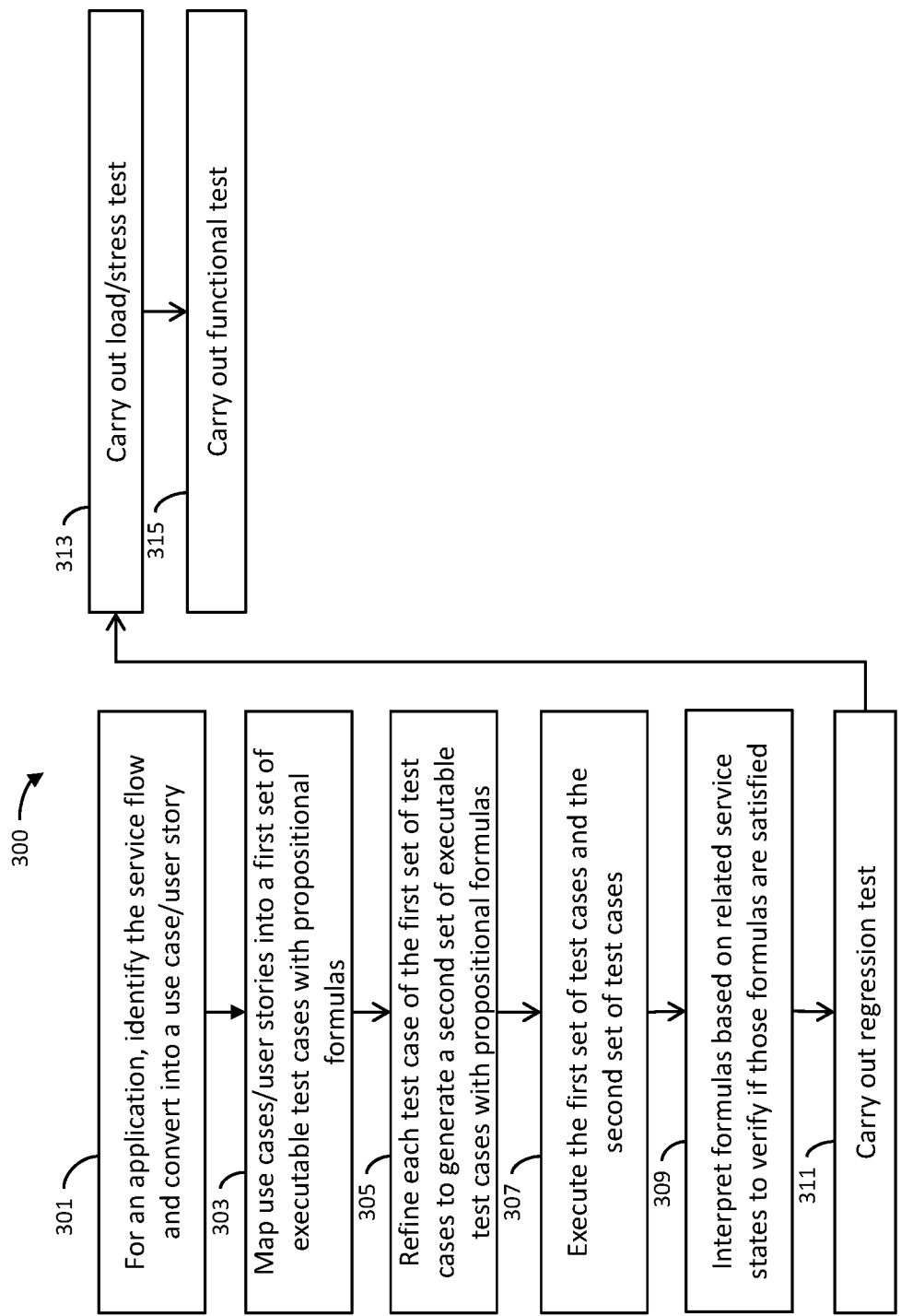
FIG. 3 is a flowchart of a method for testing a software application.

FIG. 3 is a flowchart of an application testing method 300 for testing an application design.

In step 301 the application testing method 300 identifies the service flow and converts the service flow into a use case/user story. From a functional test perspective, a service based application may be taken as a series of services S1, S2, . . . , Sn, where N is the total number of services. Let S be an instance of a service class. From black-box testing perspective, a successful service is equivalent to a condition where both of service request and service response meet service requirements In other words, service S is TRUE if and only if input of service (S.in) adheres to requirements (for both REST and SOAP services), the S.in is applied to the service S, output of service (S.out) is received by requester, and the S.out adheres to requirements.

In step 303 the application testing method 300 maps the use cases/user stories into a first set of executable test cases with propositional formulas. Each of use cases in HLD/user stories in Agile is mapped to test cases.

For each of use cases/user stories the method 300:
Identifies conditional (IF-THEN-ELSE-like and/or CASE-OF-like) branches;
Identifies service-flow for each of branches;
For each of branches, identifies input conditions and output conditions;
Maps each of branches to one test case; and
Identifies propositional statements as verification logic for the test cases based on input and relating services.

The following are some examples of mapping Use Cases to Test Cases

Sample Use Case 1

```
{
IF the "eventDomain" field of triggering alarm is "fault"
Query the mob_aots_tickets table where:
mob_aots_tickets.AlarmSourceName = @eventSourceName of triggering fault
AND
mob_aots_tickets.OriginalProblemAbstract = @alarmCondition of triggering fault
AND
TicketState != "Closed"|"Cancelled"
IF the "eventDomain" of triggering alarm is "thresholdCrossingAlert"
Query the mob_aots_tickets table where:
mob_aots_tickets.AlarmSourceName = @eventSourceName of triggering TCA
AND
mob_aots_tickets.OriginalProblemAbstract = @alertDescription of triggering TCA
AND
mob_aots_tickets.TicketState != "Closed"|"Cancelled"
IF a record is returned:
Get ticket number and ActiveOrg from record
Update this AOTS-TM ticket
IF a record is not returned
Create a ticket into AOTS-TM
}
```

Based on conditional branches of the value of eventDomain, the following test case can be generated first.

Test Case: (Conditional branch for eventDomain of triggering alarm = fault when Ruby-M receives a UEB DCAE alarm)
if eventDomain of triggering alarm = fault
Query mob_aots_tickets database table if
mob_aots_tickets.AlarmSourceName = @eventSourceName of triggering alarm
AND
mob_aots_tickets.OriginalProblemAbstract =@alarmCondition of triggering alarm
AND
mob_aots_tickets.TicketState != "Closed"|"Cancelled"

Depending on the query result, either service of aotsCreateTkt or aotsUpdateTkt will be invoked Verification proposition statements:

( FUebDcae ∧ FUebDcae.out.eventDomain = 'fault' ∧ ( TICKETINDB ( FUebDcae.out.eventSourceName, FUebDcae.out.alarmCondition)) → FaotsUpdateTicket )
( FUebDcae ∧ FUebDcae.out.eventDomain =' fault' ∧ ( ¬ (TICKETINDB ( FUebDcae.out.eventSourceName, FUebDcae.out.alarmCondition ))) → FaotsCreateTicket )
where TICKETINDB is Boolean function taking two farguments to query DB or open tickets.

Input vectors can be partitioned into two Equivalence Classes. Those input vectors in the first class have eventDomain=fault, eventSourceName=AlarmSourceName of an existing open ticket and alarmCondition=OriginalProblemAbstract of the ticket, which make invocation to service AOTSUPDATETKT. On the other hand, those in second class have eventDomain=fault and eventSourceName !=AlarmSourceName of an existing open ticket and alarmCondition !=OriginalProblemAbstract of the ticket, which make invocation to service AOTSCREATETKT. Therefore, this test case may be split into 2 test cases.

Test Case 1:

Service FUebDcae UEBDCAE_FAULT;
Boolean TicketInDB ;
Service FaotsUpdateTicket AOTSUPDATETKT_FAULT;
Verification_section ( FUebDcae ∧ FUebDcae.out.eventDomain = 'fault' ∧ (TicketInDB ( FUebDcae.out.eventSourceName, FUebDcae.out.alarmCondition )) → FaotsUpdateTicket )

Test Case 2:

Service FUebDcae UEBDCAE_FAULT;
Boolean TicketInDB;
Service FaotsCreateTicket AOTSCREATETKT_FAULT;
Verification_section ( FUebDcae ∧ FUebDcae.out.eventDomain =

```
'fault' ∧ (¬ (
TicketInDB ( FUebDcae.out.eventSourceName,
FUebDcae.out.alarmCondition
))) → FaotsCreateTicket )
```

Similarly, from the branch of eventDomain=thresholdCrossingAlert, the other two test cases can be derived as below.

Test Case 3:

```
Service TUebDcae UEBDCAE_TCA;
Boolean TicketInDB;
Service TaotsUpdateTicket AOTSUPDATETKT_TCA;
Verification_section ( TUebDcae ∧ TUebDcae.out.eventDomain =
'thresholdCrossingAlert' ∧ ( TicketInDB
( TUebDcae.out.eventSourceName,
FUebDcae.out.alarmCondition )) → TaotsUpdateTicket )
```

Test Case 4:

```
Service TUebDcae UEBDCAE_TCA;
Boolean TicketInDB;
Service TaotsCreateTicket AOTSCREATETKT_TCA;
Verification_section ( TUebDcae ∧ TUebDcae.out.eventDomain =
'thresholdCrossingAlert' ∧ ( ¬
( TicketInDB ( TUebDcae.out.eventSourceName,
TUebDcae.out.alarmCondition ))) → TaotsCreateTicket )
```

Sample Use Case 2

| Req. ID | Design Element | Trace-To |
| --- | --- | --- |
| HLD-285867-RUBY-Mobility-10 | Subscribe from the UEB to vMME alarms published by DCAE-FM. | |

| | |
| --- | --- |
| Design Element Text | RUBY-M shall subscribe from the UEB to DCAE-FM alarm messages.<br>Subscription Topic: "DCAE-HIGHLANDPARK-EVENT-OUTPUT" By subscribing to this UEB topic, RUBY-M will receive published vMME alarm messages as well as other DCAE-FM alarm messages for other virtual devices.<br>Fields of the DCAE-FM alarm message are defined in the DCAE-FM AID. |

Only UEB publish/subscribe service is involved in this use case. Initially, one would like to verify that (UebDcae.in.eventSourceName='%mmex%'\/UebDcae.in.eventSourceName='%MMEX%'→UEBDcae). Since there are two types of DCAE-FM alarms, Fault and TCA, the general test case could be divided into two test cases. For the first one (UebDcae.in.eventDomain='fault'∧UebDcae.in.eventSourceName='%mmex%'\/UebDcae.in.eventSourceName='%MMEX%')→UebDcae) and for the second, (UebDcae.in.eventDomain='thresholdCrossingAlert'∧UebDcae.in.eventSourceName='%mmex%'\/UebDcae.in.eventSourceName='%MMEX%')→UebDcae) These two test cases could further be split into the following four test cases as per mapping refinement described above.

Test Case 1

```
Service FUebDcae UEBDCAE_FAULT;
Verification_section (( FUebDcae.in.eventDomain = 'fault' ∧
FUebDcae.in.eventSourceName = '%mmex%' ∧
FUebDcae.in.send ) → FUebDcae )
```

Test Case 2

```
Service FUebDcae UEBDCAE_FAULT;
Verification_section (( FUebDcae.in.eventDomain = 'fault' ∧
FUebDcae.in.eventSourceName = '%MMEX %' ∧
FUebDcae.in.send ) →
FUebDcae )
```

Test Case 3

```
Service TUebDcae UEBDCAE_TCA;
Verification_section (( TUebDcae.in.eventDomain =
'thresholdCrossingAlert' ∧
TUebDcae.in.eventSourceName = '%mmex%' ∧
TUebDcae.in.send ) →
TUebDcae )
```

Test Case 4

```
Service TUebDcae UEBDCAE_TCA;
Verification_section (( TUebDcae.in.eventDomain =
'thresholdCrossingAlert' ∧
TUebDcae.in.eventSourceName = '%MMEX%' ∧
TUebDcae.in.send ) →
TUebDcae )
```

In step 305 the application testing method 300 refines each test case of the first set of test cases to generate an updated set of executable test cases with propositional formulas. For each of test cases the method 300:

partitions input data into Equivalence Class Partitioning (ECP) so that input in the same ECP results in the same output;

generates test cases so that input in each of ECP's is at least covered by one test case; and analyzes Boundary Value of input data and generate test cases so that values that are at the boundaries and just inside/outside of the boundaries are covered by at least one test case.

The generated test cases are executable scripts. The syntax of test cases is described using Backus-Naur Form as follows.

```
<Test Case> :: = <Verification process>
<Verification process> :: = <Service_object_declare> Verification section> |
    <Verification section> | <Verification section> < Verification process> |
    <Service_object_declare> <Verification section> < Verification process>
<Verification section> :: = verification_section ( <Propositional statement> );
<Propositional statement :: = <Composite Proposition> | <1-Connective sign>
    <Composite Proposition>
```

-continued

```
<Composite Proposition> :: = <Atomic>| <Composite Proposition> <Connective symbol> <Composite Proposition>
<Atomic> :: = TRUE | FALSE | < Identifier> <Comparison sign> <Expression>
<Comparison sign> :: = = | > | < | ≥ | ≤ | ≠
< Expression> :: = <Var>|<Expression> <Arithmetic operator> <Expression>
<Var> :: = <Identifier> | <Const>
<Arithmetic operator> :: = + | − | * | / | %
<Connective sign> :: = ∧ | ∨ | →
<1-Connective sign> :: = ¬
<Identifier> :: = <string>
<string> :: = <string><char>|<String><digit>| <char>|<string><non-char><string>
<non-char> :: = . | − | _
<Const> :: = <Const><digit>|<digit>|digit−>|−<digit−>
<digit> :: = 0 | <digit−>
<digit−> :: = 1|2|3|4|5|6|7|8|9
<char> :: = a|b|c|d|e|f|g|h|i|j|k|l|m|n|o|p|q|r|s|t|u|v|w|x|y|z
   A|B|C|D|E|F|G|H|I|J|K|L|M|N|O|P|Q|R|S|T|U|V|W|X|Y|Z
```

In step 307 the application testing method 300 executes the updated set of test cases. For each test case one wants to prove p→q is TRUE for each of test cases. When executing a test case, TC interpreter 105 will first check the state of the related services to ensure p is TRUE. If p→q is FALSE, according to Truth Table, q must be FALSE. One then checks related service state for q and if it is TRUE, then it contradicts with that q must be FALSE. Thus, p→q is TRUE.

In step 309 the application testing method 300 interprets formulas based on related service states to verify if those formulas are satisfied. A service verification_section maps to a set of base verification functions invocations. A service verification_section may include, the following verification functions applying to a specified object or a subset of object attributes to determine if the testing propositional statements are satisfied. They are:
 check request string lexical, syntactical and data type correctness;
 check request name and attributes with HLD and macro definitions;
 check request values with HLD;
 check response string lexical, syntactical and data type correctness;
 check response name and attributes verification with HLD and macro definitions; and
 check response values with HLD, among others.

A verification function (VF) is a Boolean function with a proposition statement as an argument. The function returns a TRUE if the proposition's satisfaction is verified by function, otherwise, a False is returned. Combined propositional statement is split into a group of simple statements, each of which is used as an argument to call a VF. If all of VF's return a TRUE, then verification_section returns a TRUE. Otherwise, a FALSE is returned.

In step 311 the application testing method 300 may implement a regression test. Regression tests involve tailoring ranges of functional tests based upon requirements and then invoking test cases from test case libraries.

In step 313 the application testing method 300 may implement a load/stress test. Load/Stress tests are performed with such a paradigm that users browse the data in production database to choose preferred time period, and then framework extracts the data from production database, transforms the data format to fit replaying in a testing environment. The scripts for replaying are also automatically generated. The data will be replayed with original timing and concurrency so that user can rapidly duplicate and test many real-life scenarios.

In step 315 the application testing method 300 may implement a functional test. For user stories in each of iteration or use cases in high level design, generate test cases. For each of test cases, specify service objects under test and define a verification statement. The framework will generate executable test cases and interpret them at run time so that each user story or use case has a mapping set of test cases. In the whole systems development life cycle (SDLC), if new features need to be delivered and integrated into an existing release, the corresponding test cases can be generated and executed. All of test cases form a test case library and the subset of test cases in the library can be invoked and reused for similar user stories or use cases.

Figure 4:
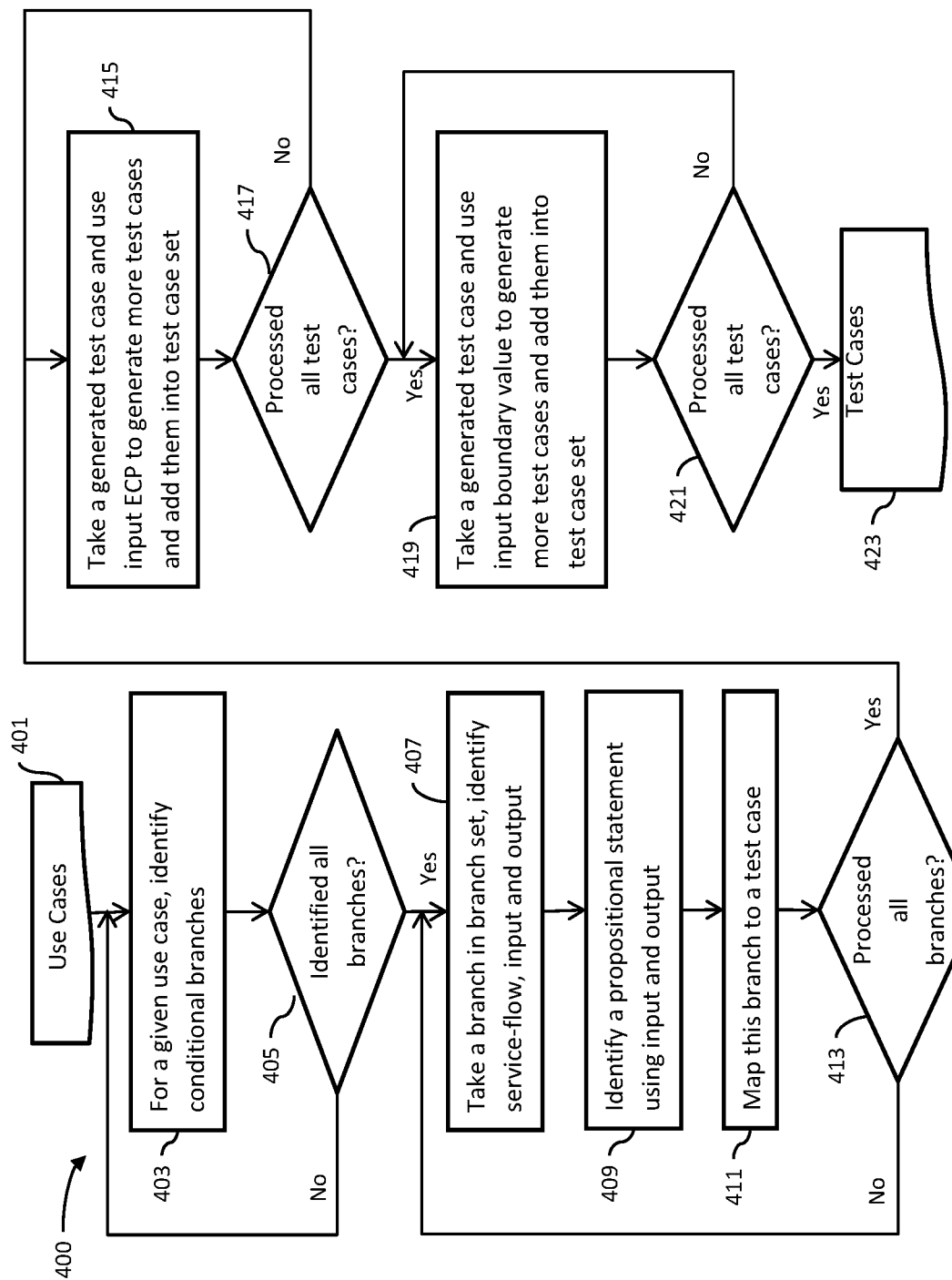
FIG. 4 is a flowchart of a method for generating test cases.

FIG. 4 is a flowchart of a method 400 for generating test cases.

In step 401 use cases for the application under test are identified.

In step 403 conditional branches for a given use case are identified.

In step 405 a determination is made about whether all branches have been identified. If all branches have not been identified then the method returns to step 403.

If all branches have been identified then in step 407 for a branch in a branch set, the service flow, input and output are identified.

In step 409 a propositional statement using input and output is identified.

In step 411 the branch is mapped to a test case.

In step 413 a determination is made as to whether all branches of been processed. If all branches have not been process than the method returns to step 407.

If all branches have been processed, then in step 415 for a generated test case and input ECP is used to generate more test cases (updated set of test cases) and to add them to the first set of test cases.

In step 417 a determination is made if all test cases have been processed. If all test cases have not been processed then the method returns to step 415.

If all test cases have been processed, then in step 419 input boundary values are used to generate additional test cases and to add them to the test case set.

In step 421 a determination is made if all test cases have been processed. If all test cases have not been processed then the method returns to step 419.

If all test cases have been processed, then in step 423 a set of all test cases is stored.

The methods described in the examples may be embodied directly in hardware, in a software module executed by a computer system having a processor, or in a combination of the two. A software module may reside in any form of memory or storage medium such as RAM memory, flash memory, ROM memory, EPROM memory, EEPROM memory, registers, hard disk, a removable disk, a CD-ROM. The memory or storage medium may be coupled to the processor such that the processor can read information from, and write information to, the memory or storage medium. Alternatively, the storage medium may be integral to the processor. The processor and the storage medium may reside in an ASIC. In some aspects, the steps and/or actions of a method may reside as one or any combination or set of codes and/or instructions on a machine readable medium and/or computer readable medium, which may be incorporated into a computer program product.

In any of the exemplary embodiments, the described functions may be implemented in hardware, software, firmware, or any combination thereof. Functions implemented in software may be stored on or transmitted over as instructions or code on a non-transitory computer-readable medium. A non-transitory computer readable medium may include computer executable instructions embodied in a computer readable medium that when executed by the processor of a computer performs the steps of the method. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed:

1. A method for testing a service based application, the method comprising:
   creating a plurality of use cases for the service based application;
   identifying a plurality of conditional branches for each of the plurality of use cases;
   determining a service flow, input and output for each of the plurality of conditional branches;
   generating propositional statement using an input and an output for each of the plurality of conditional branches;
   mapping each of the plurality of conditional branches to a mapped test case to generate a first set of test cases;
   generating a second set of test cases from each of the first set of test cases using input equivalence class partitioning; and
   simulating, based on the first set of test cases and the second set of test cases, a required service request in testing when a real service is not available; and
   running a regression test.

2. The method of claim 1 further comprising generating a third set of test cases using input boundary values.

3. The method of claim 1 wherein the first set of test cases and the second set of test cases are executable scripts.

4. The method of claim 1 wherein the first set of test cases and the second set of test cases are described using a Backus-Naur Form syntax.

5. The method of claim 1 further comprising running a load/stress test.

6. The method of claim 1 further comprising storing the first set of test cases and the second set of test cases in a data store.

7. A system for testing a service based application comprising: a computer system;
   memory coupled to the computer system and configured to store program instructions executable by the computer system to:
   create a plurality of use cases for the service based application;
   identify a plurality of conditional branches for each of the plurality of use cases;
   determine a service flow, input and output for each of the plurality of conditional branches;
   generate propositional statement using an input and an output for each of the plurality of conditional branches;
   map each of the plurality of conditional branches to a mapped test case to generate a first set of test cases;
   generate a second set of test cases from each of the first set of test cases using input equivalence class partitioning: and
   simulate, based on the first set of test cases and the second set of test cases, a required service request in testing when a real service is not available; and
   program instructions stored in the memory to run a regression test.

8. The system of claim 7 further comprising program instructions stored in the memory to generate a third set of test cases using input boundary values.

9. The system of claim 7 wherein the first set of test cases and the second set of test cases are executable scripts.

10. The system of claim 7 wherein the first set of test cases and the second set of test cases are described using Backus-Naur Form syntax.

11. The system of claim 7 further comprising program instructions stored in the memory to run a load/stress test.

12. The system of claim 7 further comprising program instructions stored in the memory to store the first set of test cases and the second set of test cases in a data store.

13. A non-transitory computer readable medium comprising computer executable instructions embodied in a computer readable medium and when executed by a processor of a computer performs steps comprising:
   creating a plurality of use cases for a service based application; identifying conditional branches for each of the plurality of use cases;
   determining a service flow, input and output for each of the conditional branches;
   generating propositional statement using an input and an output for each of the conditional branches;
   mapping each of the conditional branches to a mapped test case to generate a first set of test cases;
   generating a second set of test cases from each of the first set of test cases using input equivalence class partitioning; and
   simulating, based on the first set of test cases and the second set of test cases, a required service request in testing when a real service is not available;

computer executable instructions embodied in the computer readable medium and when executed by the processor of the computer performs a further step of running a regression test.

14. The non-transitory computer readable medium of claim 13 wherein the computer executable instructions further perform the step of generating a third set of test cases using input boundary values.

15. The non-transitory computer readable medium of claim 13 wherein the first set of test cases and the second set of test cases are executable scripts.

16. The non-transitory computer readable medium of claim 13 wherein the first set of test cases and the second set of test cases are described using Backus-Naur Form syntax.

17. The non-transitory computer readable medium of claim 13 further comprising computer executable instructions embodied in the computer readable medium and when executed by the processor of the computer performs a further step of running a load/stress test.

\* \* \* \* \*